United States Patent [19]
Hait

[11] Patent Number: 5,359,988
[45] Date of Patent: Nov. 1, 1994

[54] SPHERICAL COOKING UNIT

[75] Inventor: Paul W. Hait, Sun River, Oreg.

[73] Assignee: Pyromid, Inc., Redmond, Oreg.

[21] Appl. No.: 937,558

[22] Filed: Sep. 28, 1992

[51] Int. Cl.5 .............................................. F24B 3/00
[52] U.S. Cl. .................................. 126/25 R; 126/9 R;
126/163 R; 126/153; 126/9 B; 99/446; 99/448;
236/101 R
[58] Field of Search ...................... 126/25 R, 9 R, 9 B,
126/41 R, 153, 38, 152 B, 29, 152 R, 163 R, 160,
30, 145, 43, 146; 99/400, 446, 448, 467, 482;
236/101 R

[56] References Cited

U.S. PATENT DOCUMENTS

| | | | |
|---|---|---|---|
| 2,154,305 | 4/1939 | Goerl | 126/38 |
| 2,573,211 | 10/1951 | Manzler | 126/25 R |
| 3,841,211 | 10/1974 | Ellis | 126/25 R |
| 4,243,013 | 1/1981 | Goon et al. | 126/43 |
| 4,334,462 | 6/1982 | Hefling | 126/9 R |
| 4,489,706 | 12/1984 | Hait | 126/9 R |
| 4,531,505 | 7/1985 | Hait | 126/9 R |
| 4,587,947 | 5/1986 | Tomita | 126/9 R |
| 4,829,975 | 5/1989 | Hait | 126/9 R |
| 4,884,551 | 12/1989 | Hait | 126/9 R |
| 4,896,650 | 1/1990 | Hait | 126/9 R |
| 5,086,752 | 2/1992 | Hait | 126/9 R |

OTHER PUBLICATIONS

Gourmet International Barbeque Cookbook, p. 6, Apr. 1972 Edition.
Advertising Literature published by Pyromid, Inc., entitled "Pyromid Outdoor Cooking Systems", published in 1986, 5 sheets.
Advertising Literature published by Walgreen Drug Stores, one sheet disclosing the Weber Smokey Joe and the Weber Bar-B-Kettle.
Advertising Literature published by Pyromid, Inc., entitled "America's Portable Grill Stove", published 1987, 6 sheets.
Advertising Literature published by Igloo Corporation, one sheet.
Copy of packaging of 9 Inch Vegetable Steamer in Stainless Steel sold by Cook's Club, one sheet.

Primary Examiner—James C. Yeung
Attorney, Agent, or Firm—Jack M. Wiseman

[57] ABSTRACT

An outdoor cooking unit comprises a hollow, hemispherical base that increases in diameter from top to bottom. Detachably secured to the hemispherical base is a hollow, hemispherical firebox that decreases in diameter from top to bottom. Supported by the firebox is a hollow, hemispherical cover that increases in diameter from top to bottom. Disposed within the firebox is an adjustable fuel element holder, which is contractable and expandable to regulate the concentration and diffusion of heat provided by the fuel elements. A heat sensitive device controls the expansion of the fuel element holder in accordance with the intensity of the heat in the firebox.

11 Claims, 15 Drawing Sheets

SPHERICAL COOKING UNIT

BACKGROUND OF THE INVENTION

The present invention relates in general to outdoor cooking units.

Heretofore, portable outdoor cooking units were supported by carts, tables, tripod arrangements and legs. Such portable outdoor cooking units did not employ a hemispherical base and particularly a hemispherical base that served as a warming unit.

The Weber Covered Barbeque Kettle has been sold by Weber-Stephen Products Co., which included a bowl-shaped firebox supported by a tripod-leg arrangement. Positioned within the firebox is a fuel grate on which briquettes are disposed. Positioned within the firebox above the fuel grate is a cooking grill on which food is disposed for cooking. A bowl-shaped cover is also supported by the bowl-shaped firebox. The same company sells a Weber Smokey Joe Grill, which is a kettle-type barbeque cooking unit, but smaller in size and is supported by loop-shaped legs.

The U.S. patent to Hait, U.S. Pat. No. 5,086,752, issued on Feb. 11, 1992, for Outdoor Cooking Unit With A Pedestal Stand discloses an outdoor cooking unit in which a pedestal stand supports a firebox above the ground. The firebox has an inverted, truncated pyramidal configuration. Disposed within the firebox is a fire grate. A cooking grill is disposed above the fire grate. The pedestal stand includes a pillar having an inverted, truncated pyramidal configuration on which is supported the firebox. An ash receptacle is disposed at the bottom of the pillar. A V-stand disposed on a cooking grill supports a chicken or other suitable fowl for cooking. See also pending U.S. patent application, Ser. No. 07/802,813, filed by Paul W. Hait on Dec. 6, 1991, for Outdoor Pedestal Stand Cooking Unit With Foldable Components. The assignee of the present application is also the assignee of the aforementioned pending application.

In the patent to Hait, U.S. Pat. No. 4,884,551, issued on Dec. 5, 1989, for Outdoor Cooking Unit, there is disclosed a kettle-type outdoor cooking unit. The outdoor cooking unit includes an hemispherical cooking unit and an hemispherical cover above the hemispherical cooking unit. At the top of the hemispherical cooking unit is supported a depending firebox. Above the firebox is disposed a cooking grill.

In the U.S. patent to Hait, U.S. Pat. No. 4,489,706, granted on Dec. 25, 1984, for Multi-Purpose Fuel Efficient Portable Stove/Heater, there is disclosed a portable stove and heater. At the lower extremity of the portable stove and heater is located a chamber in which food is warmed or maintained warm. The warming chamber is formed in part by a tray.

Cooks Club of Harrison, N.J., has distributed a vegetable steamer made of stainless steel. The vegetable steamer is adjustable so that the diametric extent and depth thereof can be adjusted. The vegetable steamer comprises a perforated flat base. Hingedly attached to the flat base are successively overlapping sector-shaped perforated panels. Each panel overlaps and underlies adjacent respective panels. Through this arrangement, the vegetable steamer can be adjusted in diametric extent and in depth.

Pyromid, Inc. of Redmond, Oreg., has manufactured and sold outdoor cooking units in which a stainless steel cooking grill is formed with openings aligned in rows and in columns.

The patent to Hait, U.S. Pat. No. 4,829,975, issued on May 16, 1989, for Cooking Unit With Improved Fire Grate discloses an outdoor cooking unit with a folded windbreak that seats along a cooking grill. The cooking grill is formed with openings aligned in rows and in columns. See also the patent to Hait, U.S. Pat. No. 4,896,650, issued on Jan. 30, 1990, for Cooking Unit With Improved Fire Grate and the U.S. patent to Hait, U.S. Pat. No. 4,884,551, issued on Dec. 5, 1989, for Outdoor Cooking Unit. A fire grate is disclosed therein configured to receive the narrow section of briquettes and the briquettes are vertically oriented. The U.S. patent to Hait et al., U.S. Pat. No. 4,531,505, issued on Jul. 30, 1985, for Convertible Cooking Units With An Oven discloses a rectanguloid base that serves as an oven.

SUMMARY OF THE INVENTION

An object of the present invention is to provide an outdoor cooking unit with oppositely directed generally hemispherically-shaped base and firebox joined at the reduced diameter ends thereof.

A feature of the present invention is that the hemispherical base for the outdoor cooking unit forms a warming chamber.

Another object of the present invention is to provide an outdoor cooking unit with oppositely directed generally hemispherically-shaped base and firebox joined at the reduced diameter ends thereof and a generally hemispherically-shaped cover disposed on said firebox with the increased diameter end of the cover confronting the increased diameter end of the firebox.

Another object of the present invention is to provide an outdoor cooking unit that is dimensioned to accommodate various commercially available cooking utensils, such as a Mongolian beef cooking utensil, Burton Super Stove Top Grill, Circulon grill, Ghinggis Khan Broiler No. 30, a conventional perforated grill, and a Shabu-Shabu Country Vegetable Cooker.

Another object of the present invention is to provide an outdoor cooking unit using charcoal as the fuel element, which maintains a desirable temperature and source of smoke without sacrificing taste, and yet prevents the fat and juices of the cooked food from falling directly onto the charcoal.

Another feature of the present invention is that the generally hemispherically-shaped base, firebox and cover have similar dimensions and are capable of nesting one within another.

Another feature of the present invention is to provide a kettle-type outdoor cooking unit with an adapter and grill for preparing beef.

Another feature of the present invention is to provide a kettle-type outdoor cooking unit with an adjustable holder for supporting fuel elements within a firebox.

Another feature of the present invention is to provide an adjustable holder for supporting fuel elements in which the dimensions thereof are automatically adjusted according to the temperature within a firebox.

Another feature of the present invention is to provide a kettle-type outdoor cooking unit with a vertical holder for fowl and an upright cylindrical wall surrounding the vertical holder for improved heat concentration in the roasting of the fowl.

Another feature of the present invention is to provide a kettle-type outdoor cooking unit with a rack for preparing smoked meat.

Another feature of the present invention is to provide an outdoor cooking unit with an adjustable holder for supporting fuel elements within a firebox and the adjustable fuel holder collects ash dropping from the fuel elements for removing the fallen ash with the removal of the fuel holder without sacrificing the free flow of combustion air.

Another feature of the present invention is to provide an outdoor cooking unit that can be disassembled with facility and the cooking utensils thereof lend themselves to be cleaned in a convenient manner.

DETAILED DESCRIPTION OF THE PREFERRED EMBODIMENTS

Figure 1:
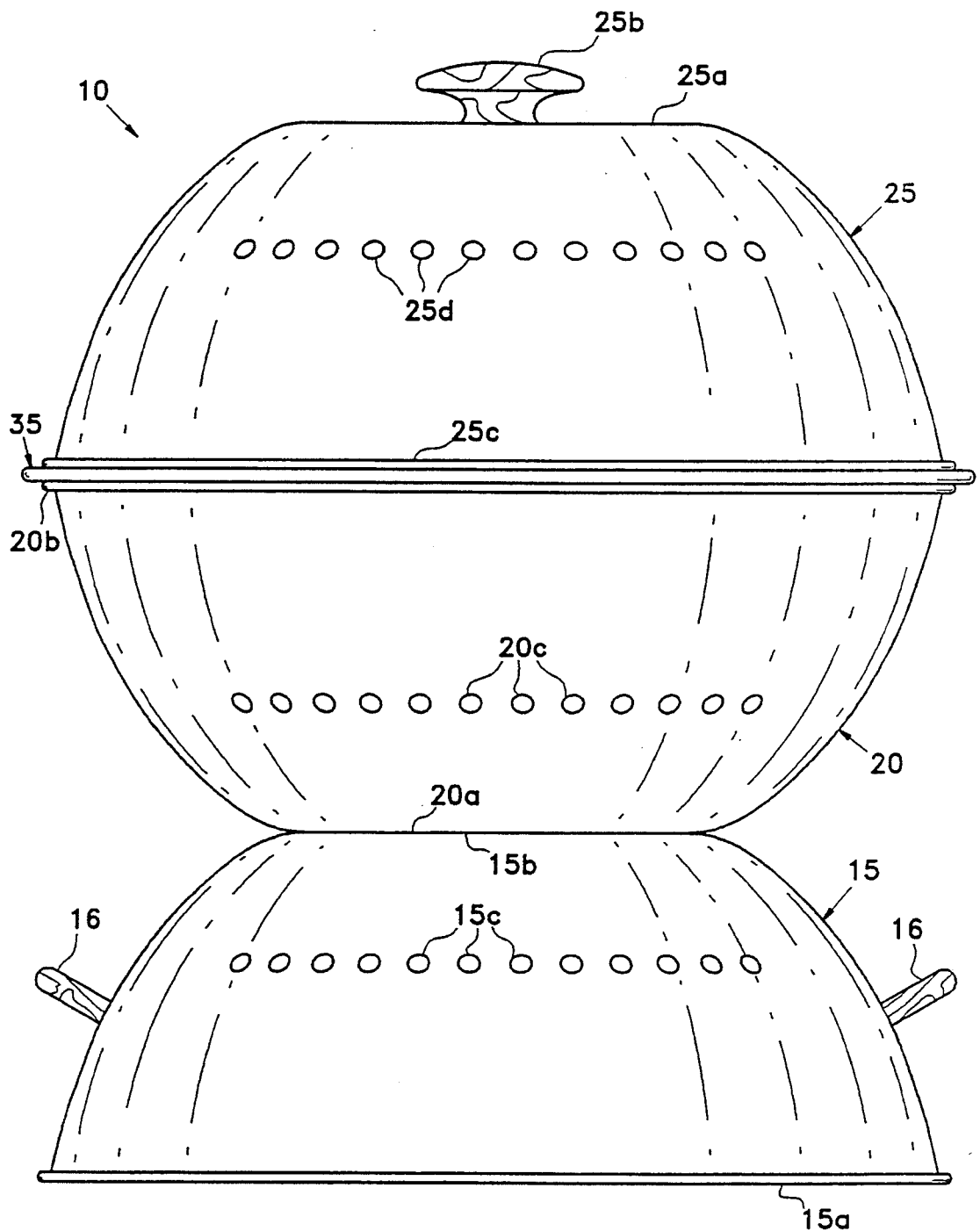
FIG. 1 is an elevation view of the outdoor cooking unit embodying the present invention.

Illustrated in FIG. 1 is an outdoor cooking unit 10 embodying the present invention. The outdoor cooking unit 10 comprises a generally hemispherically-shaped base 15, which increases in diameter from top to bottom. At the bottom of the base 15 is a suitable flanged rim 15a that seats on a supporting surface. At the top of the base 15 is a flat wall 15b. Suitable apertures 15c are formed in the base 15 for air to circulate into and out of a warming chamber 15d of the base 15. Suitable handles 16 are secured to the base 15 along the exterior wall thereof. In the exemplary embodiment, the handles 16 may be removably secured to the base 15 by threaded rods embedded in the handles 16, received by suitable openings in the base 15 and secured by nuts in threaded engagement with the threaded rods. The handles 16, in the exemplary embodiment, are made of wood. Disposed within the warming chamber 15d is a suitable warming plate 17.

Detachably secured to the base 15 is a generally hemispherical firebox 20. The firebox 20 decreases in diameter from top to bottom. At the bottom of the firebox 20 is a flat wall 20a that is detachably secured to the flat wall 15b of the base 15. For this purpose, a bolt 21 (FIG. 3) is received by suitable aligned openings in the base 15 and the firebox 20. A suitable wing nut 22 is disposed in threaded engagement with the bolt 21 to detachably secure the firebox 20 to the base 15. A suitable flanged rim 20b is formed at the top of the firebox 20. Suitable apertures 20c are formed in the firebox 20 in order for combustion air to enter the heating chamber 20d of the firebox 20.

In the preferred embodiment, the base 15 and the firebox 20 have similar dimensions. The base 15 and the firebox 20, in the exemplary embodiment, are made of stainless steel.

Removably seated on the firebox 20 is a generally hemispherically-shaped cover or hood 25. The top of the hood 25 has a flat wall 25a. A suitable handle 25b is secured to the flat wall 25a of the hood 25. The handle 25b, in the preferred embodiment, is made of wood or other non-conducting material. In the exemplary embodiment, the handle 25b may be detachably secured to the cover 25 in any suitable, well-known manner. For example, a threaded rod may be embedded in the handle 25b and received by a suitable opening in the cover 25 and secured by a nut in threaded engagement with the rod.

In the exemplary embodiment, the cover 25 is made of stainless steel. The cover 25, in the preferred embodiment, has dimensions similar to the dimensions of the base 15 and the firebox 20, respectively. Along the bottom of the cover 25 is a flanged rim 25c that seats on the flanged rim 20b of the firebox 20. Formed in the cover 25 are suitable apertures 25d for air to circulate into and out of a cooking chamber 25e (FIG. 2) formed by the cover 25. Combustion air entering the cooking chamber 25e will circulate into the firebox 20. The apertures 25d are spaced from the handle 25b toward the bottom of the cover 25 so that the air vented through the apertures 25d will be directed away from the handle 25b.

Disposed within the firebox 20 at the bottom thereof is an adjustable fuel holder 30 for supporting thereon suitable fuel elements, such as charcoal briquettes. The fuel holder 30 is a conventional stainless steel vegetable steamer basket sold by Cook's Club of Harrison, N.J. Similar vegetable steamer baskets have been sold by Norpro of Everett, Wash., and Progressive of Seattle, Wash. In the exemplary embodiment, the fuel holder 30 comprises a flat base 30a formed with suitable apertures in order for combustion air to enter the fuel holder 30. Hingely attached to the flat base 30a are successively overlapping sector-shaped perforated panels 30b formed with suitable apertures in order for combustion air to enter the fuel holder 30. Each panel 30b overlaps and underlies adjacent respective panels. Through this arrangement, the holder 30 can be expanded and contracted. The holder 30 is adjustable in diametric extent and is adjustable in depth for regulating the concentration of the heat produced by the fuel elements. The greater the diametric extent, the lesser the depth. Conversely, the greater the depth, the lesser the diametric extent. The greater the depth and the lesser the diametric extent of the fuel holder 30, the greater the heat concentration in cooking the food on the cooking grill. On the other hand, the greater the diametric extent and the lesser the depth of the fuel holder 30, the greater the heat diffusion in cooking the food on the cooking grill. For rapid igniting of the fuel elements, the holder 30 is adjusted for greater depth and lesser diametric extent. In the rapid igniting state, a conventional lighter tablet centrally located on the base 30a may be employed for igniting the fuel elements within the holder 30. Legs 30c at the bottom of the holder 30 seat on the bottom of the firebox 20 to provide space for the flow and passage of combustion air. While the fuel holder 30 is formed with suitable apertures for combustion air to enter the fuel holder 30, the apertures are sufficiently small to contain ashes within the fuel holder 30. Thus, the fuel holder 30 also serves as an ash holder.

Figure 2:
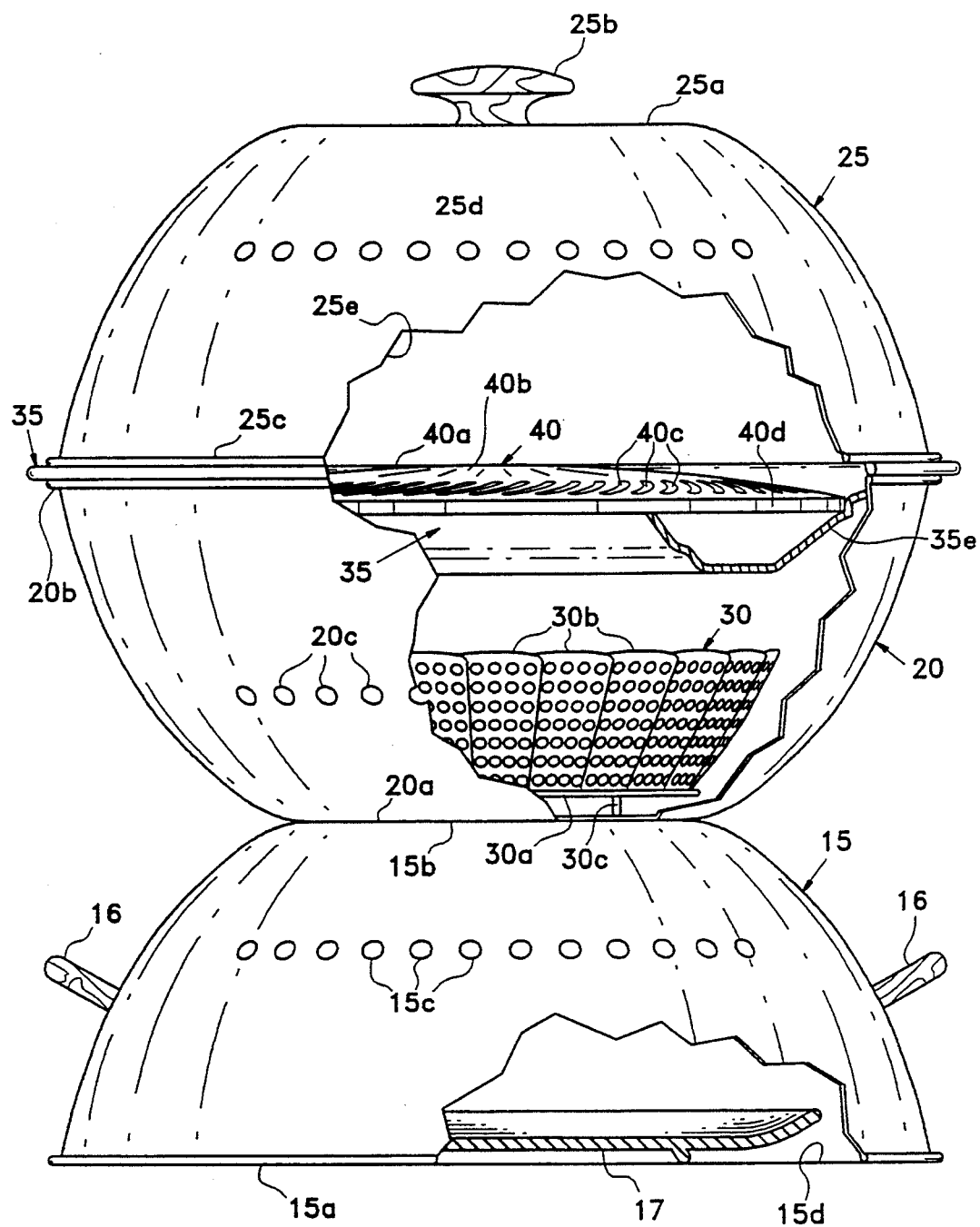
FIG. 2 is an elevation view of the outdoor cooking unit shown in FIG. 1 adapted for cooking beef with parts thereof broken away to illustrate the arrangement of the components thereof.
Figure 3:
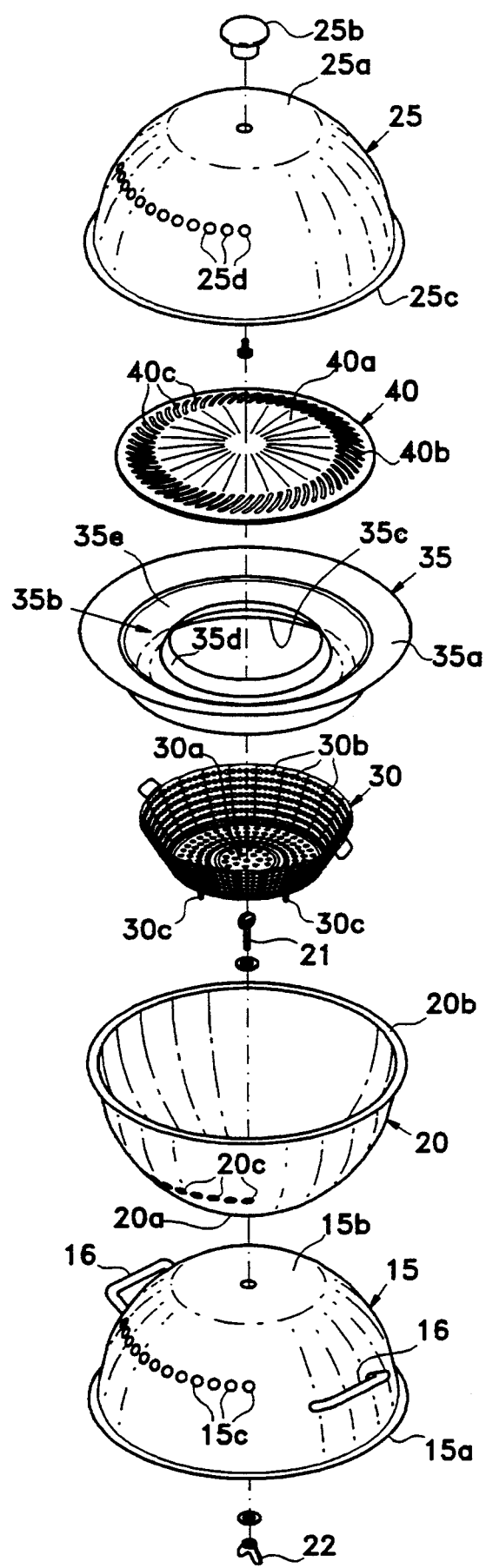
FIG. 3 is an exploded view of the outdoor cooking unit shown in FIG. 2.

In the embodiment of the present invention shown in FIGS. 2 and 3, a conventional grill adapter 35 is removably seated on the flange rim 20b of the firebox 20 between the rim 25c of the cover 25 and the rim 20b of the firebox 20. The grill adapter 35 includes an outwardly, inclined annular flange rim 35a that seats on the flange rim 20b of the firebox 20. A recessed annular body 35b is formed in the grill adapter 35 with a central opening 35c. The recessed body 35b is formed with an inwardly, reduced diameter annular wall 35d joined by an outwardly, increased diameter annular wall 35e. Removably seated on the grill adapter 35 is a conventional cylindrical grill 40 suitable for preparing Mongolian beef or a roast beef. The grill 40 is generally in the form of a plate with a central portion 40a slightly elevated. A section 40b of the grill 40 between the central portion 40a and the rim 20b of the firebox 20 is formed with openings in the configuration of angularly disposed slots 40c. The rim of the grill 40 seats on the wall 35e of the adapter 30. Hickory chips for adding a barbeque smoking flavor can be disposed in the recessed annular body 35b (FIG. 3) of the adapter 35 below the angularly disposed slots 40c of the grill 40. In lieu of hickory chips for adding a barbeque smoking flavor, the recessed annular body 35b of the adapter 35 below the angularly disposed slots 40c of the grill 40 may be employed for the heating of hors d'oeuvres. In those instances in which the food being cooked has excessive flow of juices, the juices will flow through the angularly disposed slots 40c of the grill 40 into the recessed annular body 35b of the adapter 35. Of course, in such an event, neither hickory chips nor hors d'oeuvres will be stored in the recessed annular body 35b of the adapter 35. The adapter 35 and the grill 40, in the exemplary embodiment, are made of suitable steel and are coated with a black, heat resistant paint. The cover 25, when used, is seated on the rim of the adapter 35. The adapter 35 and the grill 40 have been sold by Max Burton Enterprises, Inc. of Tacoma, Wash., as the Burton Super Stove Top Grill. It is contemplated that other grills may be employed in lieu of the grill 40, such as the CIRCULON grill made in Hong Kong and the GHINGGIS KHAN BROILER No. 30 made in Japan.

Figure 4:
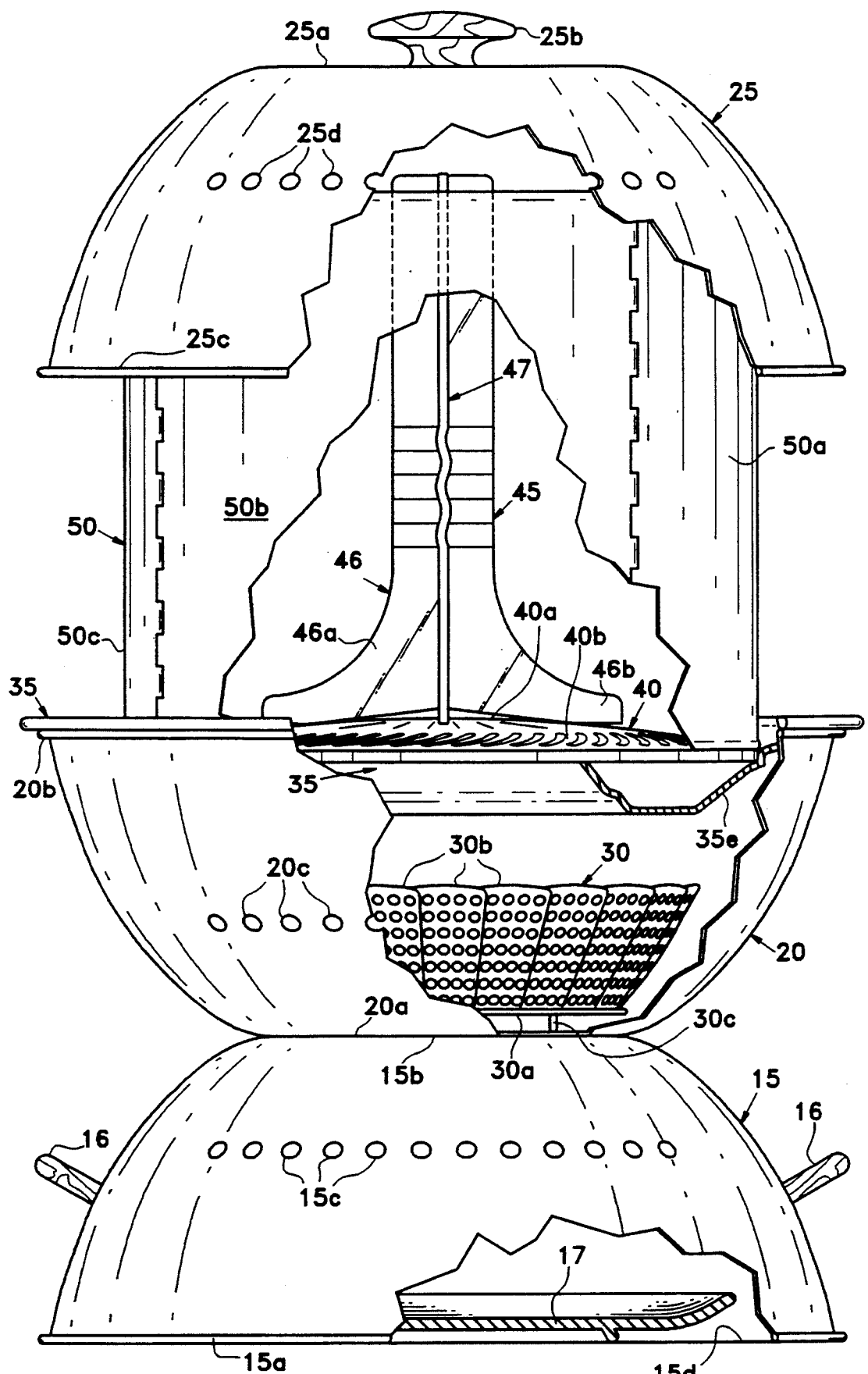
FIG. 4 is an elevation view of the outdoor cooking unit shown in FIG. 1 adapted for roasting fowl with parts thereof broken away to illustrate the arrangement of the components thereof.
Figure 5:
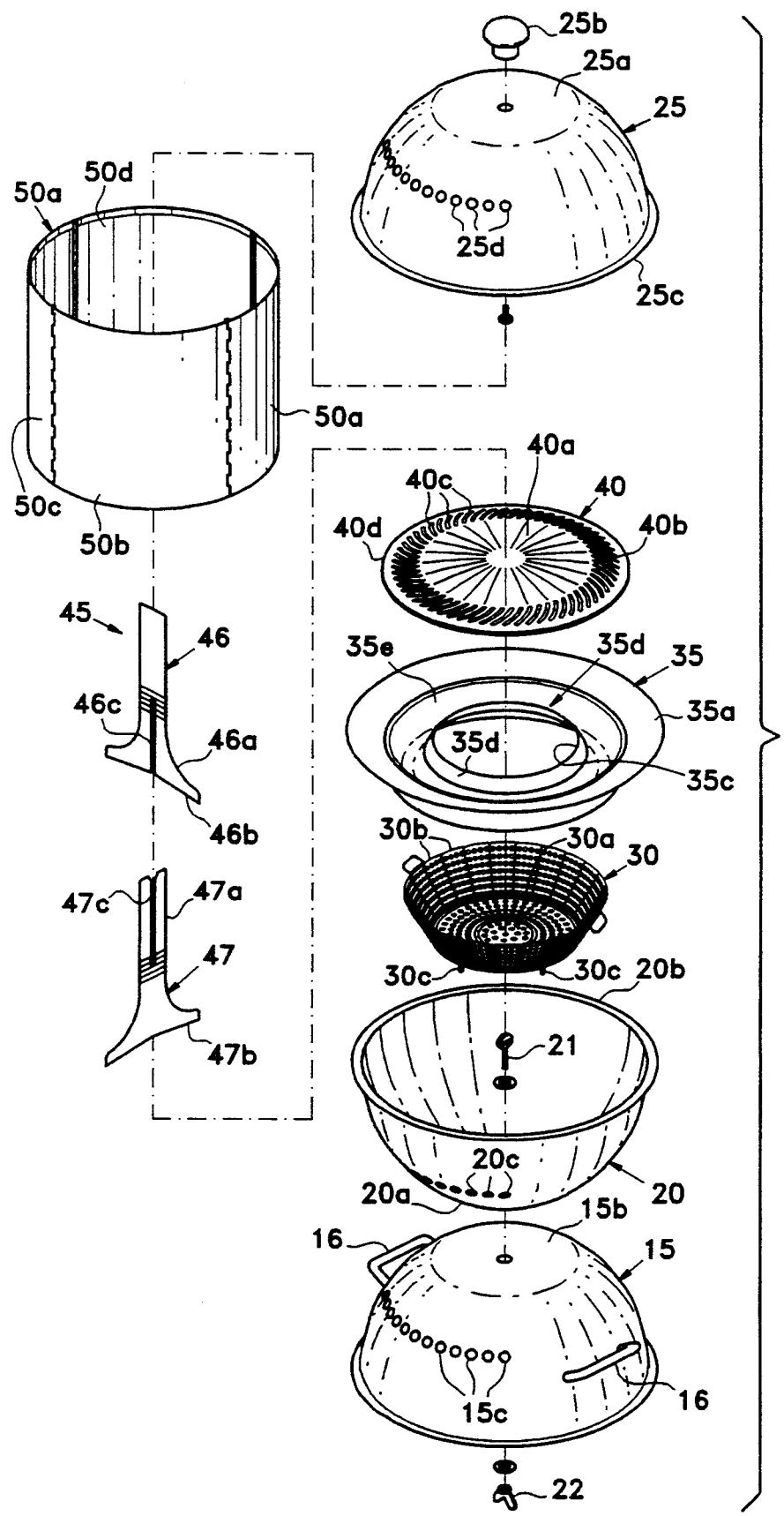
FIG. 5 is an exploded view of the outdoor cooking unit shown in FIG. 4.

In the embodiment shown in FIGS. 4 and 5, a conventional V-stand vertical support 45 for roasting fowl is disposed on the grill 40 within the central portion 40a of the grill 40. The V-stand 45 is of the type disclosed in U.S. Pat. No. 5,086,752. In the exemplary embodiment, the stand 45 comprises upstanding generally flat members 46 and 47, which are at right angles to one another. The member 46 comprises an upstanding post 46a widened at the lower extremity thereof to form aligned legs 46b and formed with a central vertical slot 46c extending generally midway between the top and bottom of the stand 45 and terminating with an opening at the bottom of the aligned legs 46b thereof. Similarly, the member 47 comprises an upstanding post 47a widened at the lower extremity to form aligned legs 47b and formed with a central vertical slot 47c extending generally midway between the top and bottom of the stand 45 and terminating with an opening at the top of the post 47a. The slot 46a of the member 46 is received by separated post segments of the member 47, and the slot 47a of the member 47 is received by separated aligned legs of the member 46 to form separable vertical, interlocked perpendicular legs and posts for supporting vertically the carcass of a chicken or the like. The members 46 and 47 are separable to facilitate the transporting and storing thereof.

Surrounding the vertical support 45 in spaced relation thereto is a cylindrical wall 50 with a vertical axis. The cylindrical wall 50 is formed with arcuate, upright panels 50a–50d. Successive panels 50a–50d are suitably hinged to one another at adjacent sides to form a foldable wall. The cylindrical wall 50, in the exemplary embodiment, is made of stainless steel and provides a heat reflector for improved concentration of heat to roast the fowl supported vertically by the stand 45. In the preferred embodiment, the diameter of the cylindrical wall 50 is coextensive with the outer diameter of the grill 40. The cover 25 is removably seated on the top of the wall 50 during the roasting of fowl. Hence, the cylindrical wall 50 also provides a spacer support for the cover 25 during the roasting of fowl supported vertically by the stand 45. The cover 25 forms a cooking chamber within which is disposed partially the cylindrical wall 50 and the stand 15.

Figure 6:
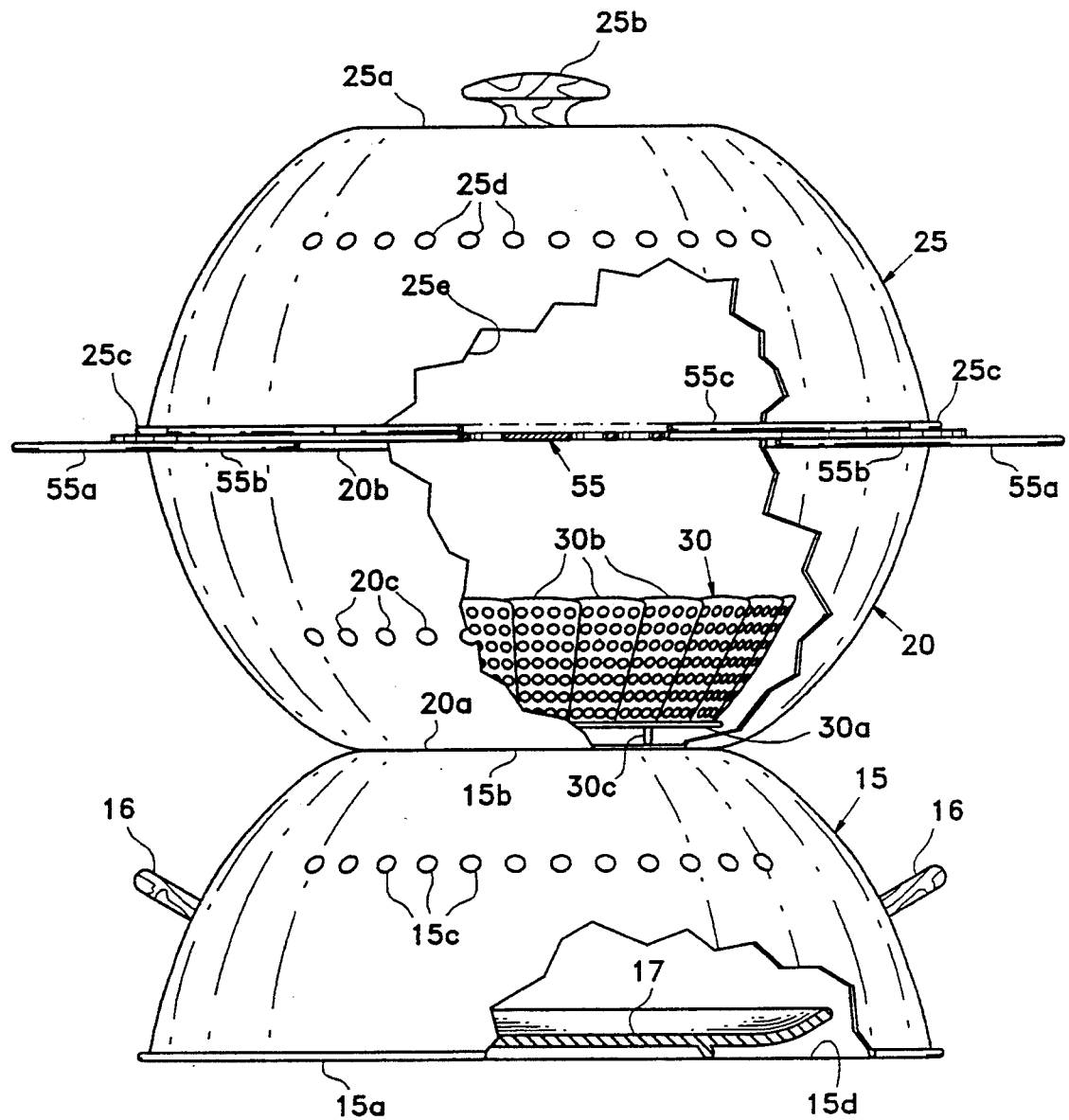
FIG. 6 is an elevation view of the outdoor cooking unit shown in FIG. 1 adapted for cooking food on a perforated grill with parts thereof broken away to illustrate the arrangement of the components thereof.
Figure 7:
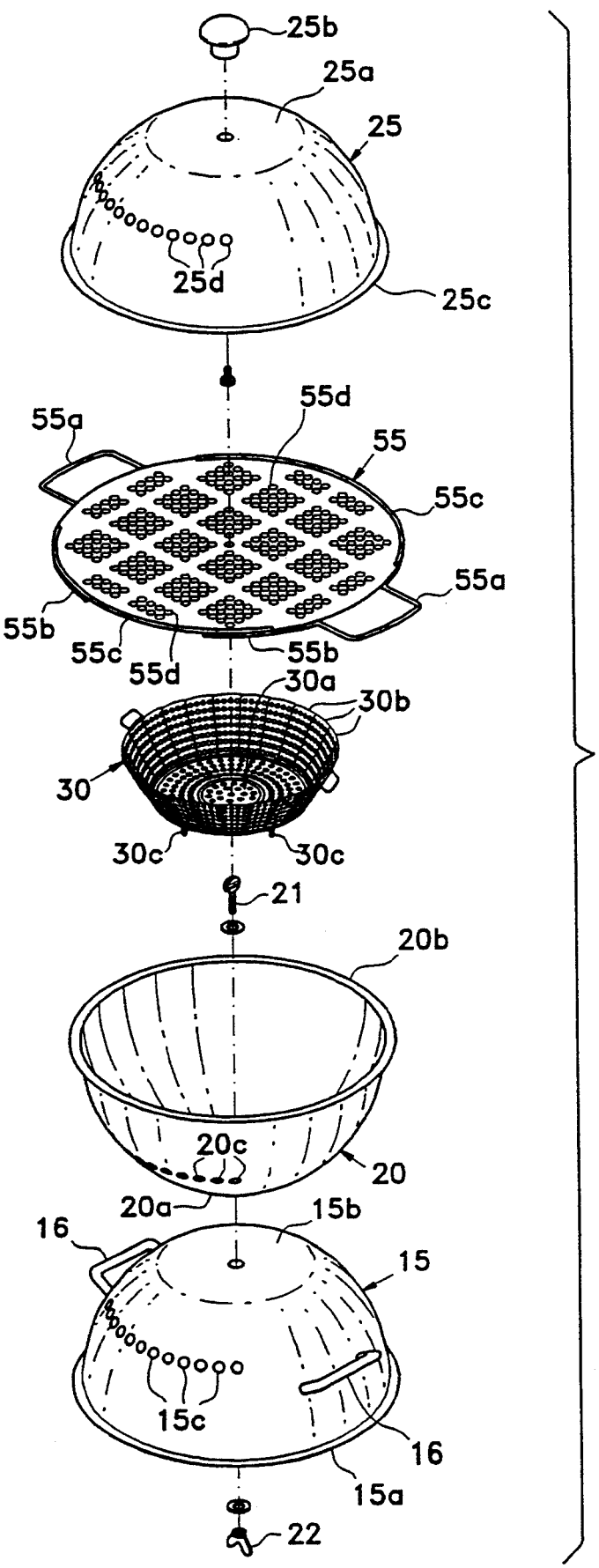
FIG. 7 is an exploded view of the outdoor cooking unit shown in FIG. 6.

In the embodiment shown in FIGS. 6 and 7, a perforated grill 55 is provided for the more conventional cooking of food. The perimeter of the perforated grill 55 is slightly outboard of the top of the firebox 20. The perforated grill 55 seats on the top of the firebox 20. Located at diametrically opposite locations of the grill 55 are suitable handles 55a. The handles 55a are secured to the bottom wall of the grill 55 and have extensions 55b soldered or welded to the bottom wall of the grill 55. The configurations of the extensions 55b conform to the configuration of the periphery of the grill 55 to which they are secured. Secured to the top wall of the grill 55 are rim ridges 55c which extend between the handles 55a at opposite locations of the periphery of the perforated grill 55. In the exemplary embodiment, openings 55d of the grill 55 are formed in segregated rows and columns in rectangular sections and patterns. Removably seated on top of the grill 55 is the cover 25. The flanged rim 25c of the cover 25 is limited in its displacement relative to the grill 55 by the ridges 55c.

It is contemplated that STERNO cooking fuel may be employed as well as charcoal briquettes as fuel elements. Additionally, it is contemplated that PYROLITE charcoal starter tablets may be used to ignite the charcoal briquettes. STERNO cooking fuel, charcoal briquettes and PYROLITE starter tablets have heretofore been employed in conjunction with outdoor cooking units manufactured and sold by Pyromid, Inc. of Redmond, Oreg.

Figure 8:
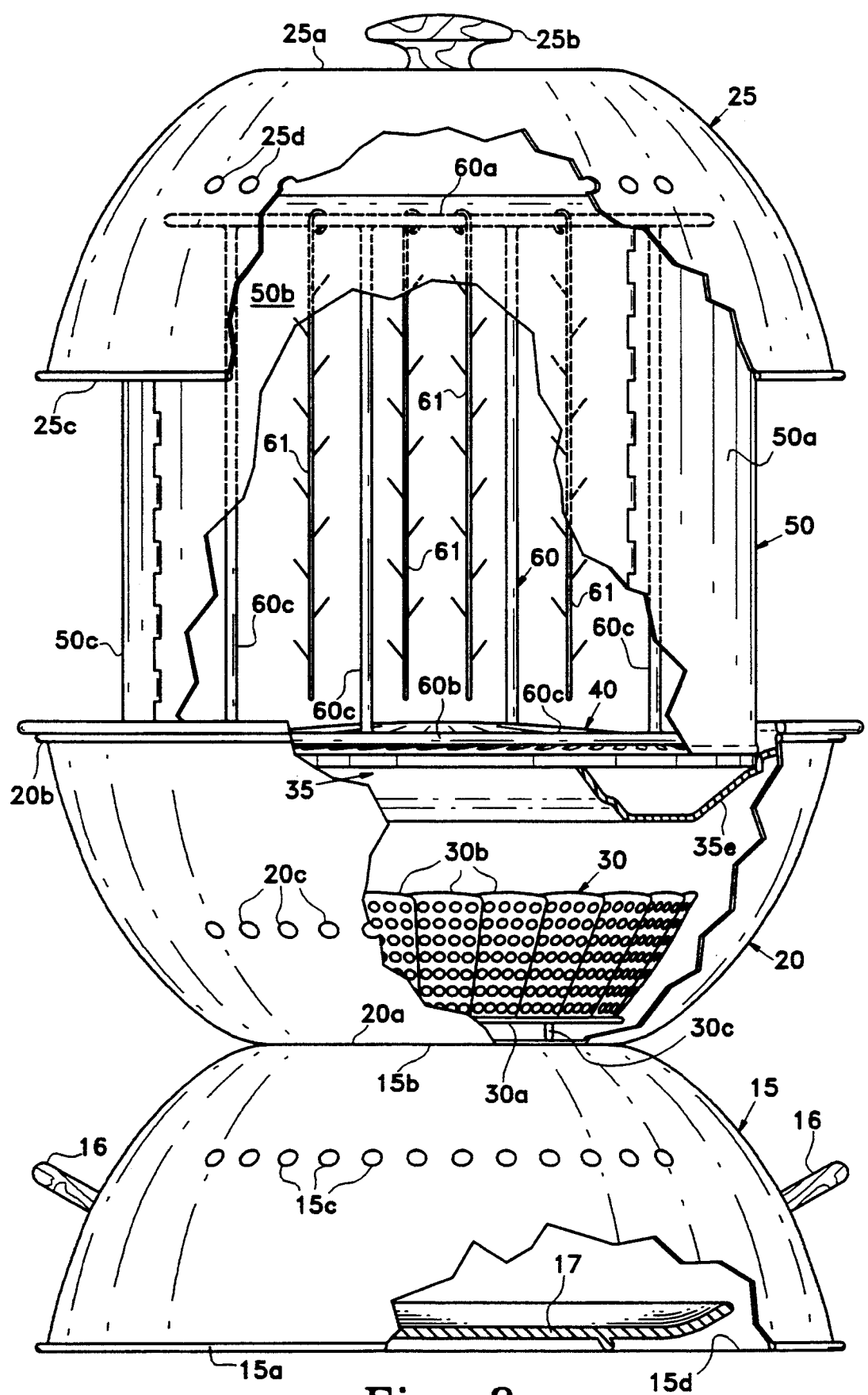
FIG. 8 is a diagrammatic elevation view of the outdoor cooking unit shown in FIG. 1 adapted for preparing smoked meat with parts thereof broken away to illustrate the arrangement of the components thereof.
Figure 9:
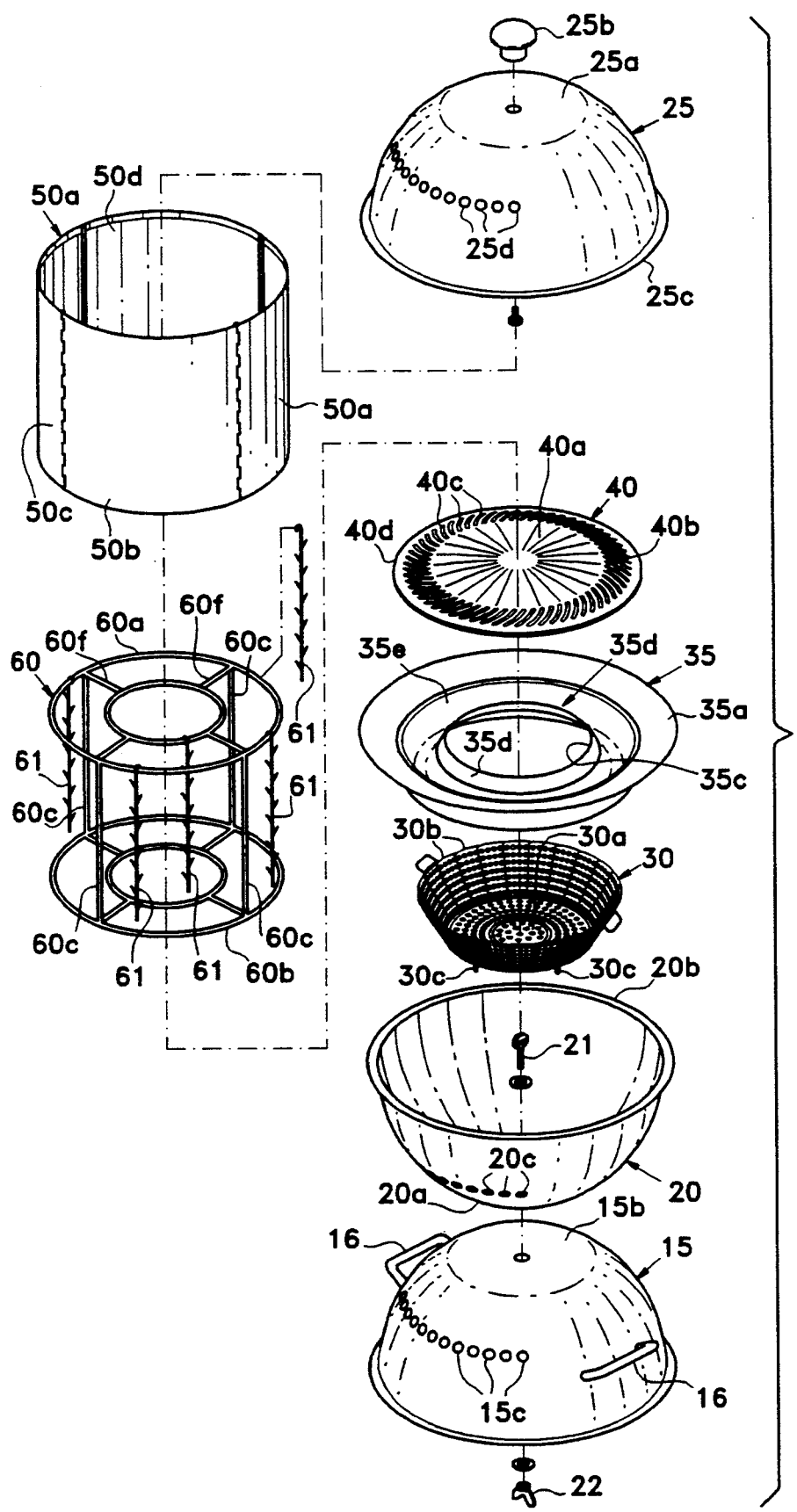
FIG. 9 is a diagrammatic exploded view of the outdoor cooking unit shown in FIG. 8 and particularly illustrating a rack for smoking meat.

Illustrated in FIGS. 8 and 9 is the outdoor cooking unit 10 adapted for preparing smoked meat. In the embodiment of the present invention illustrated in FIGS. 8 and 9, a suitable cylindrically shaped support rack 60 is removably seated on the grill 40. The support rack 60, in the exemplary embodiment, is made of stainless steel parts. In the exemplary embodiment, the support rack 60 comprises vertically spaced members 60a and 60b interconnected by angularly spaced, upright, rigid support rods 60c. The lower member 60b is in the form of a wire ring sufficiently rigid to maintain the cylindrical configuration of the rack 60 and to support the upper member 60a and the support rods 60c along with any load that they may carry. The support rods 60c are sufficiently rigid to support the upper member 60a and any load it may carry. The upper member 60a is in the form of concentric wire rings 60d and 60e interconnected by radially disposed rods 60f. The concentric rings 60d and 60e and the radial rods 60f are disposed in planar relation and are sufficiently rigid to maintain the cylindrical configuration of the rack 60 and to support pieces of meat suspended from meat support hooks 61. The meat support hooks are suspended from the concentric wire rings 60d and 60e. In the preferred embodiment, beef is suspended from the hooks 61 to be cured for providing beef jerky. However, other forms of meat may be cured on the rack 60.

Surrounding the support rack 60 in spaced relation thereto is the cylindrical wall 50. The cylindrical wall 50 serves as a heat reflector for improved heat concentration during the heating of the meat on the rack 60. The cover 25 forms a cooking chamber and is removably seated on the top of the wall during the curing of the meat on the rack 60. The cylindrical wall 50 also provides a spacer support for the cover 25 during the curing of meat suspended from the rack 60. Hickory chips, for adding a barbeque smoking flavor, can be disposed in the recessed annular body 35b of the adapter 35 below the angularly disposed slots 40c of the grill 40.

Illustrated in FIGS. 3, 5, 7 and 9 is the adjustable fuel holder 30 for supporting thereon suitable fuel elements, such as charcoal briquettes. As previously described, the fuel holder 30 is adjustable in diametric extent and is adjustable in depth for regulating the concentration of the heat produced by the fuel elements. The greater the diametric extent, the lesser the depth. Conversely, the greater the depth, the lesser the diametric extent. The greater the depth and the lesser the diametric extent of the fuel holder 30, the greater the heat concentration in cooking the food on the cooking grill. On the other hand, the greater the diametric extent and the lesser the depth of the fuel holder 30, the greater the heat diffusion in cooking the food on the cooking grill.

Figure 10:
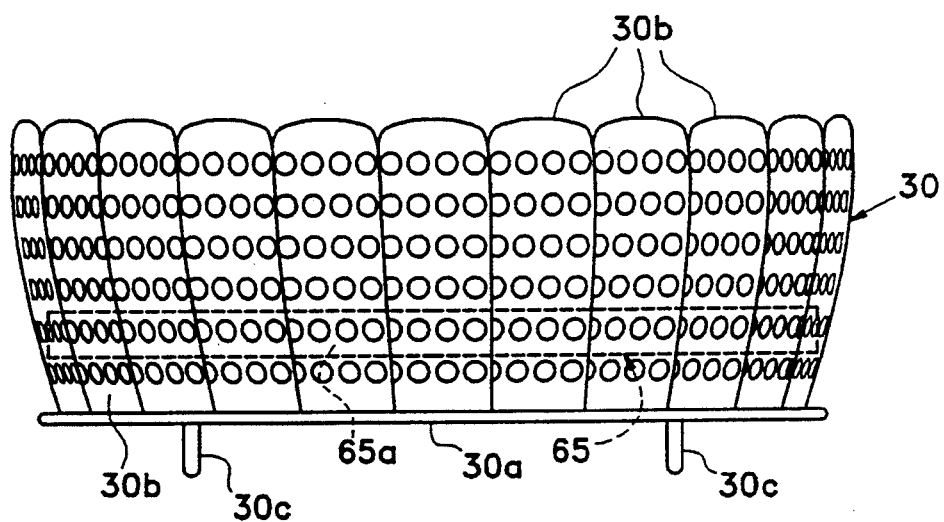
FIG. 10 is a diagrammatic illustration in elevation depicting an adjustable holder for supporting fuel elements in which the dimensions thereof are automatically adjustable according to the temperature within the firebox.

For automatically increasing the diametric extent and for automatically reducing the depth of the fuel holder 30 to lessen the concentration of the heat produced by the fuel elements and to increase the diffusion of heat produced by the fuel elements, a heat sensitive control device 65 (FIGS. 10 and 11) is provided. The heat sensitive control device 65, in the exemplary embodiment, comprises an interrupted bimetallic band that is disposed inside of the fuel holder 30 in engagement with the inner walls of the panels 30b. In the preferred embodiment, the interrupted bimetallic band 65 comprises a strip of metal 65a bonded face-to-face with another strip of metal 65b, which strips of metal expand, respectively, at different rates as the temperature in the firebox 20 rises. In the exemplary embodiment, the strip 65a is made of copper and the strip 65b is made of nickel. Other bimetallic arrangements may be employed such as copper and chromium, and copper and steel. The band 65 can also be made of a single metal with a high coefficient of expansion as the temperature rises, such as stainless steel 304. The two metals of the bimetallic band 65 expand at different rates as the temperature or heat within the firebox 20 rises or increases. The band 65 is urged toward linearity or tends to straighten out as the temperature or heat within the firebox 20 rises or increases. This action urges the hinged panels 30b to pivot outwardly from the base 30a to expand the fuel holder 30 outwardly as shown in dotted line in FIG. 11 and reduce the depth of the fuel holder 30. As previously described, the sector-shaped panels 30b are hingedly attached at the bottom thereof to the base 30a of the fuel holder 30. The expansion of the fuel holder 30 outwardly and the reduction of depth of the fuel holder 30, as the temperature or heat in the firebox 20 rises or increases, results in greater heat diffusion and lesser heat concentration from the fuel elements within or on the fuel holder 30. In the exemplary embodiment, the band 65 is disposed above and in the vicinity of the base 30a of the fuel holder 30.

Figure 11:
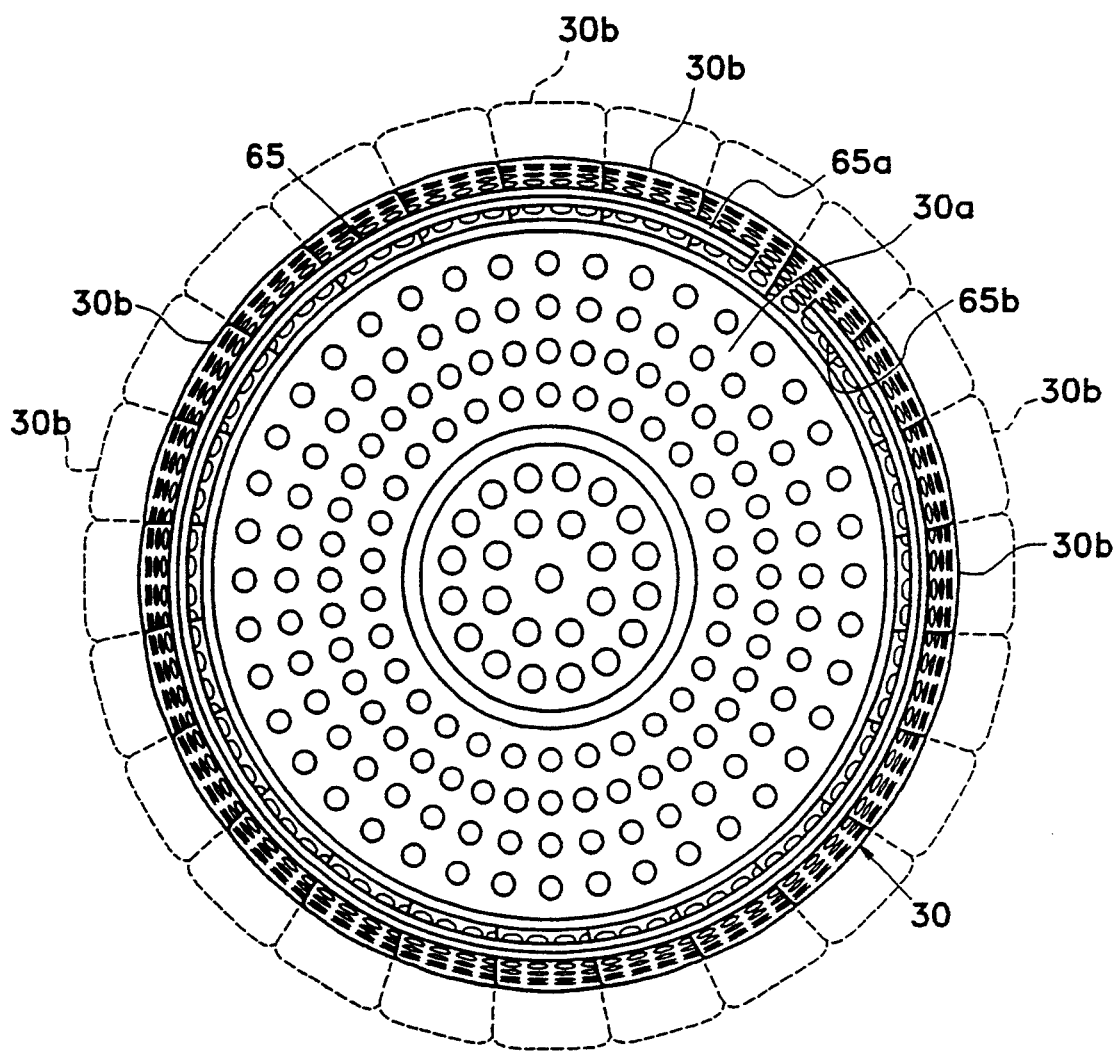
FIG. 11 is a diagrammatic plan view of the adjustable holder for supporting fuel elements shown in FIG. 10 and illustrating a device for automatically adjusting the dimensions of the fuel holder according to the temperature in the firebox.

The band 65 may be made of a single metal, such as stainless steel 304. As the temperature or heat in the firebox 20 rises or increases, the single metal band 65 is urged toward linearity or tends to straighten out. This action urges the hinged panels 30b to pivot outwardly from the base 30a to expand the fuel holder 30 outwardly as shown in FIG. 11 in dotted line and reduce the depth of the fuel holder 30. The expansion of the fuel holder 30 outwardly and the reduction of the depth of the fuel holder 30, as the temperature or heat in the firebox 20 rises or increases, results in greater heat diffusion and lesser heat concentration from the fuel elements within or on the fuel holder 30. In the exemplary embodiment, the single metal band 65 is disposed above and in the vicinity of the base 30a of the fuel holder 30.

Figure 12:
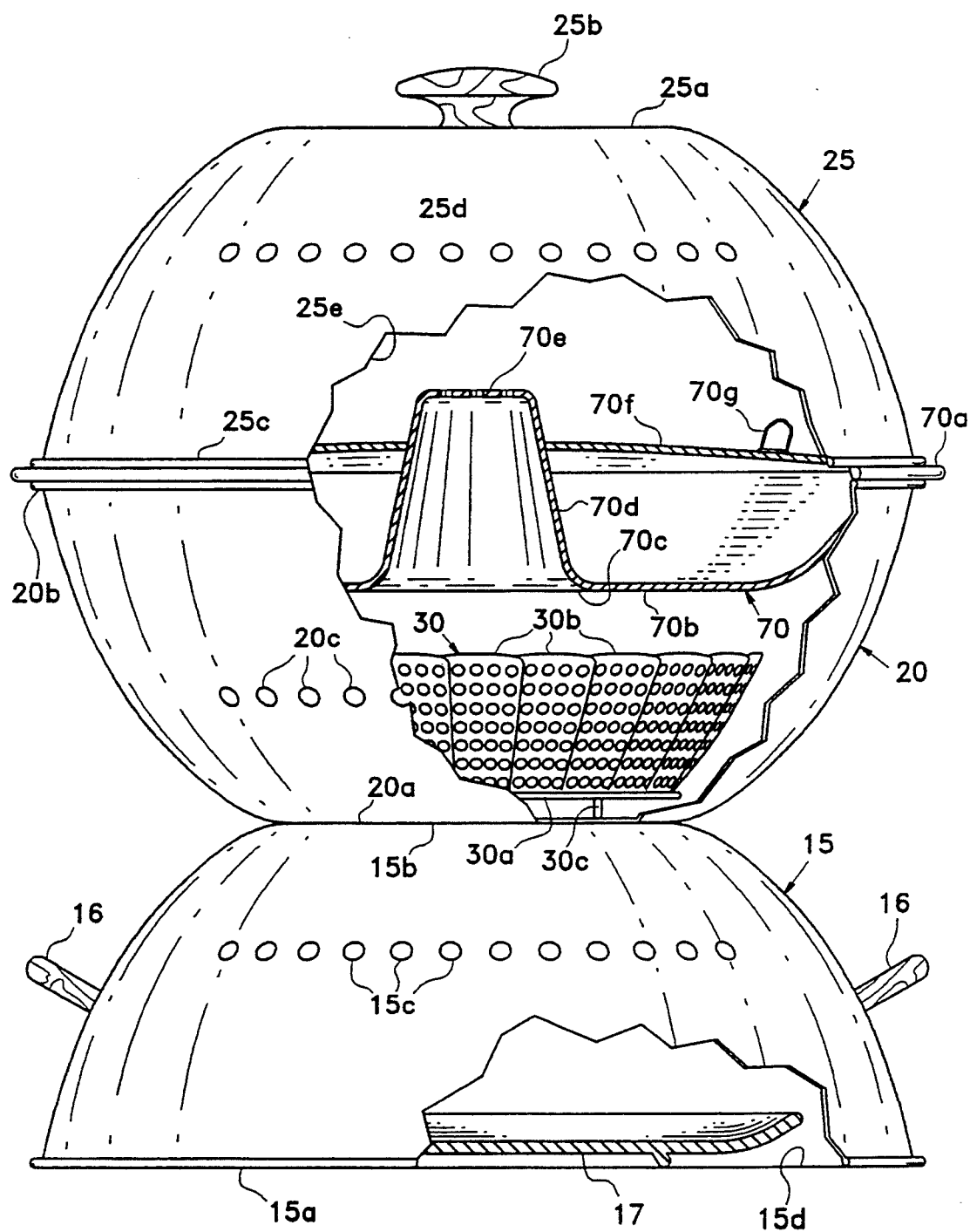
FIG. 12 is a diagrammatic elevation view of the outdoor cooking unit shown in FIG. 1 adapted for cooking thin sliced beef and vegetables in a broth with parts thereof broken away to illustrate the arrangement of the components thereof.
Figure 13:
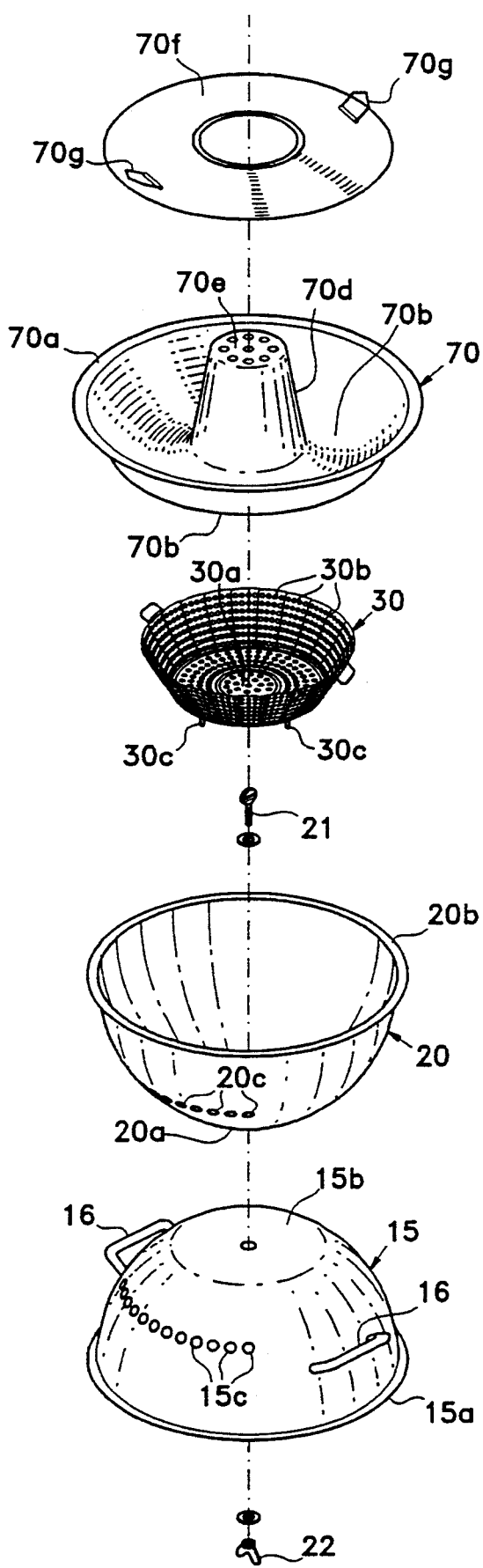
FIG. 13 is a diagrammatic exploded view of the outdoor cooking unit shown in FIG. 12 and particularly illustrating the cooking utensils employed in the cooking of the thin sliced beef and vegetables in a broth.

In the embodiment shown in FIGS. 12 and 13, a conventional and well-known tube pan 70 is formed with a rim 70a. The tube pan 70 is disposed within the firebox 20 and the rim 70a engages the inner wall of the firebox 20 to be suspended within the firebox 20. The tube pan 70 and a lid 70f therefor are made in Japan and are referred to as Shabu-Shabu Country Vegetable Cooker.

The tube pan 70 comprises an open top cooking vessel 70b with a central opening 70c formed in the base thereof from which opening a vertical hollow tube 70d extends upwardly. The hollow tube 70d is disposed above the fuel holder 30 and extends above the firebox 20. The hollow tube 70d is integrally formed with the cooking vessel 70b. On the upper extremity of the hollow tube 70d is a perforated top 70e. Seated on the top of the cooking vessel 70b is the removable lid 70f with a central opening for receiving the hollow tube 70d. The removable lid 70f is removed from the vessel 70b by suitable handles 70g. The hollow tube 70d permits heat to be conducted to the center of the vessel 70b. In the exemplary embodiment, thinly sliced beef, vegetables and a broth are disposed in the vessel 70b and are heated by the ignited fuel elements in the fuel holder 30 with the lid 70f seated on the cooking vessel 70b.

Figure 14:
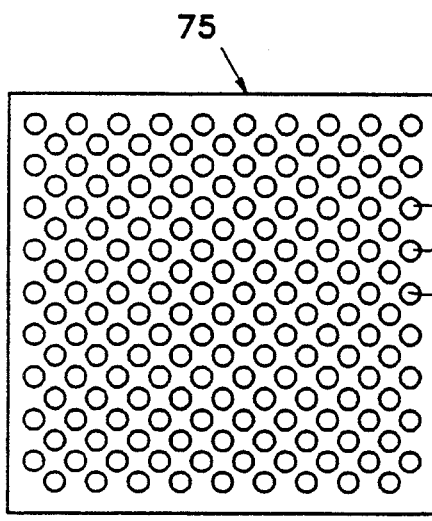
FIG. 14 is a plan view of a modification of the cooking grill illustrated in FIGS. 6 and 7.

Reference is made to FIGS. 6 and 7. In lieu of the cooking grill 55, a cooking grill 75 (FIG. 14) may be employed. The grill 75 has a rectangular configuration. Closely spaced holes 75a are formed throughout the cooking grill 75 for the cooking of food that requires high temperatures. The grill 75 is supported by the inner wall of the firebox 20 with the corners thereof engaging the inner wall of the firebox 20.

Figure 15:
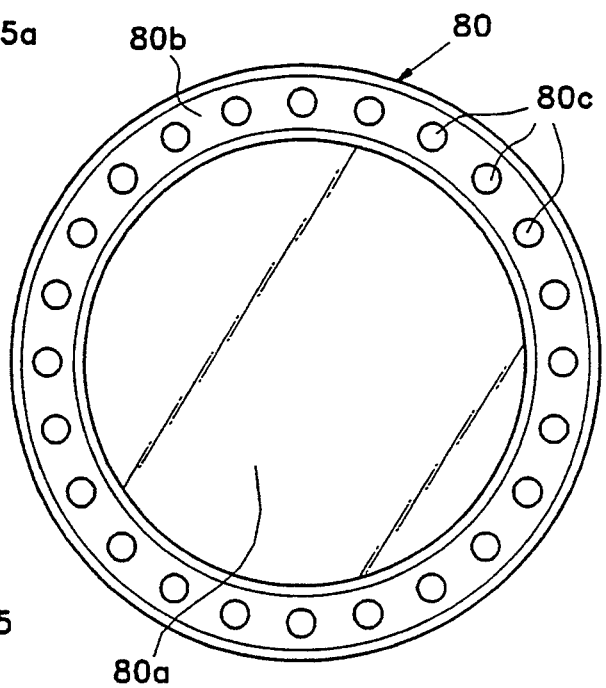
FIG. 15 is a plan view of another modification of the cooking grill illustrated in FIGS. 6 and 7.
Figure 16:
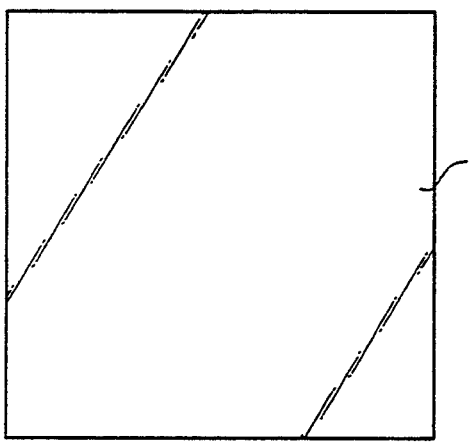
FIG. 16 is a plan view of another modification of the cooking grill shown in FIGS. 6 and 7.
Figure 17:
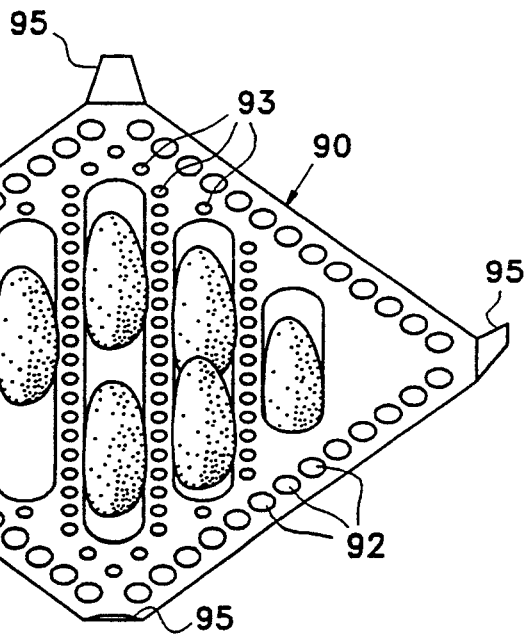
FIG. 17 is a perspective view of a fire grate for use in the outdoor cooking unit shown in FIGS. 6 and 7.
Figure 18:
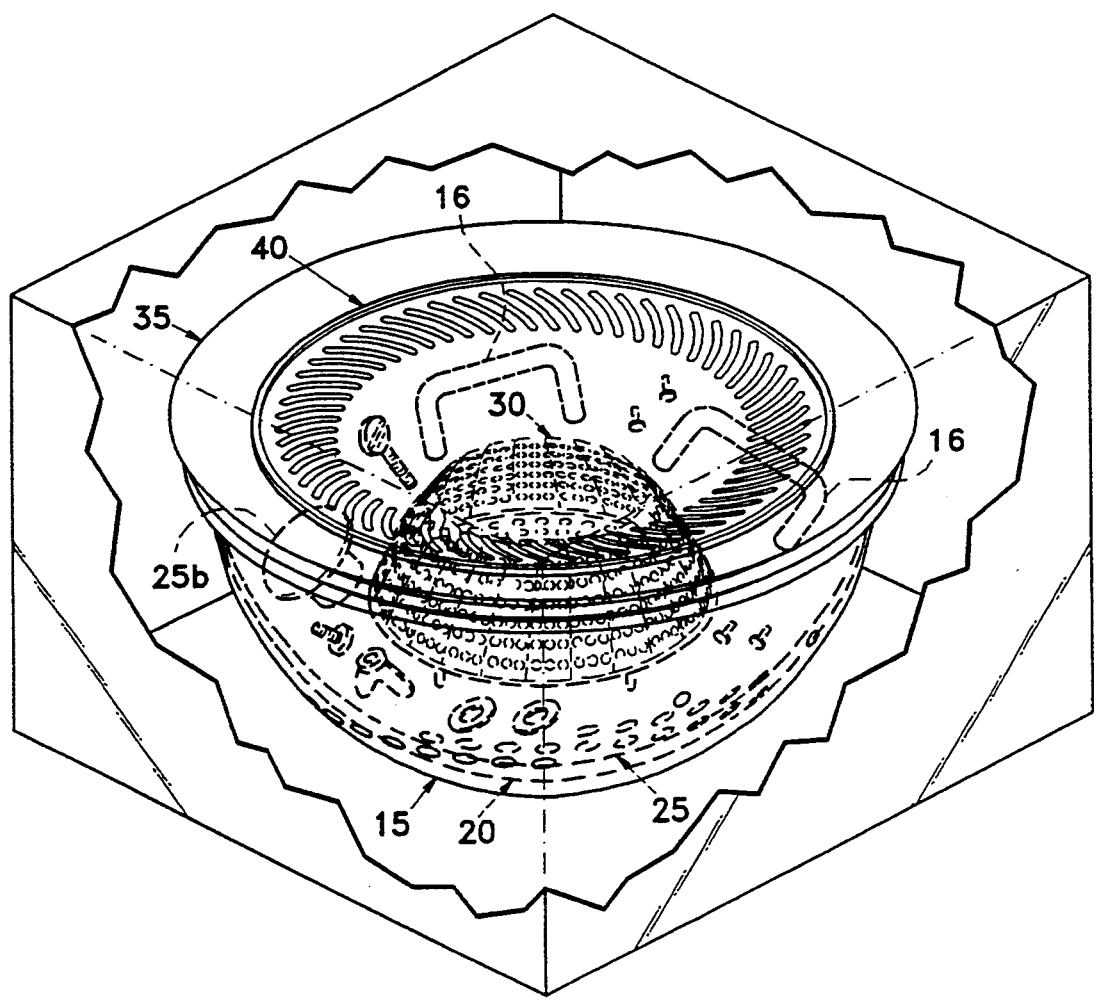
FIG. 18 is an elevational view illustrating the outdoor cooking unit shown in FIGS. 2 and 3 packed in a carton for transporting and storing with portions of the carton cut-a-way to illustrate the arrangement of the parts of the outdoor cooking unit.

In a similar manner, a cooking grill 80 (FIG. 15) may be employed in lieu of the cooking grill 55. The cooking grill 80 has a cylindrical configuration and comprises a non-perforated center plate 80a surrounded by an annular section 80b formed with openings 80c. The cooking grill 80 is usable as a frying pan. In a like manner, a cooking grill 85 (FIG. 16) may be employed in lieu of the cooking grill 55. The cooking grill 85 is a non-perforated plate that is disposed in the firebox 20 with the corners thereof engaging the inner wall of the firebox 20. The cooking grill 85 is suitable for the cooking of food on a solid grill to inhibit grease and fat from spilling onto the fuel and ignite, such as may occur in cooking hamburgers and the like.

With further reference to FIGS. 6 and 7, a fire grate 90 is used in lieu of the fuel holder 30. The fire grate 90 is formed with parallel, diagonal slots 91. The slots 91 are configured to receive the narrow edge or narrow width section of a briquette or fuel element. The narrow section of the briquette or fuel element extends upwardly or is vertically oriented. The walls of the slots 91 support the briquettes or fuel element for vertical or upstanding orientation. The flat wide bottom section and the flat wide top section of the briquette or fuel element are horizontally oriented in the slot 91. The openings 92 and 93 of the fire grate 90 are for the free flow of combustion air through the fire grate 90 for improved combustion. The fire grate 90 is disclosed in detail in the patent to Hait, U.S. Pat. No. 4,884,551 and the patent to Hait, U.S. Pat. No. 4,896,650, for Cooking Unit With An Improved Fire Grate. Tabs 95 extend from the corners of the base of the fire grate 90 for engaging the inner wall of the firebox 20 along with the corners of the fire grate 90 for seating the fire grate 90 within the firebox 20. The tabs 95 extend upwardly and outwardly from the base of the fire grate 90.

The cooking grills 75, 80 and 85 can respectively be used in the outdoor cooking unit shown in FIGS. 6 and 7 when the fire grate 90 is used in place of the fuel holder 30.

Figure 19:
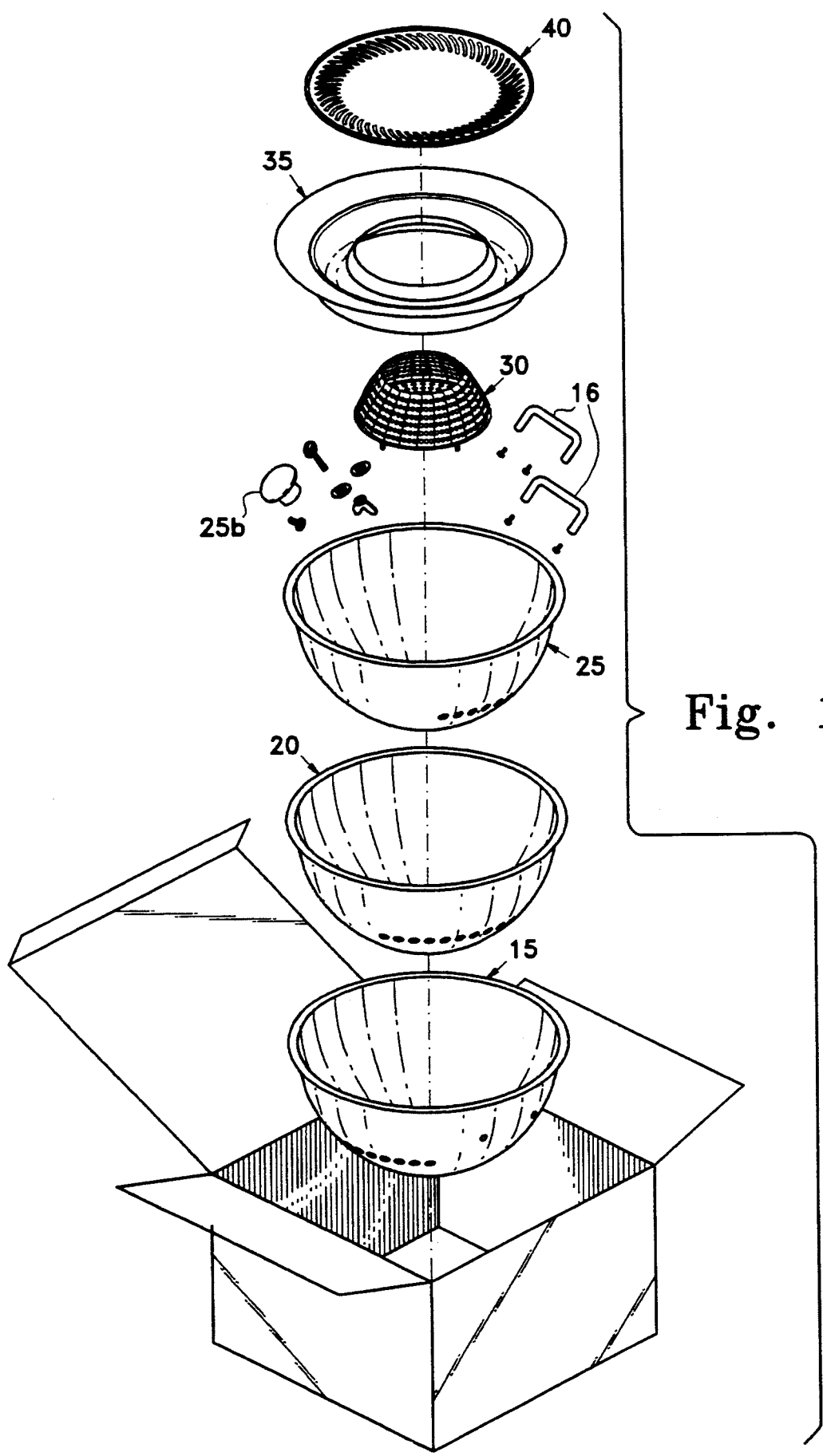
FIG. 19 is an exploded view illustrating the outdoor cooking unit shown in FIGS. 2 and 3 packed for transporting and storing.

Illustrated in FIGS. 19 and 20 is a carton C in which is stored the outdoor cooking unit 10 (FIGS. 2 and 3). Initially, the base 15, the firebox 20 and the cover 25 are nested one within the other. The smaller diameter sections of the base 15, firebox 20 and the cover 25 are placed on the bottom panel of the carton C and the larger diameter sections of the base 15, the firebox 20 and the cover 25 are placed in an elevated position above the base of the carton C.

Disposed within the cover 25 is the fuel holder 30 folded for least extent of the diameter thereof and maximum depth thereof. The holder 25b of the cover 25 is removed from the cover 25 and placed within the cover 25. Similarly, handles 16 of the base 15 may be removed from the base 15 and placed within the cover 25. The grill adapter 35 is positioned on the cover 25 and the grill 40 is positioned on the grill adapter. Optionally, the warming plate 17, not shown in FIGS. 19 and 20, may be disposed either below the base 15 or on top of the grill 40.

What is claimed is:
1. An outdoor cooking unit comprising:
   (a) a generally hemispherical hollow base increasing in diameter from the top thereof toward the bottom thereof;
   (b) a generally hemispherical hollow firebox attached to the top of said generally hemispherical base, said generally hemispherical firebox decreasing in diameter from the top thereof toward the bottom thereof; and
   (c) a holder for fuel elements disposed in said firebox, said holder being adjustable in depth and in diametric extent for regulating the concentration of heat produced by fuel elements, said holder being formed with apertured panels for combustion air to enter said holder.
2. An outdoor cooking unit comprising:
   (a) a generally hemispherical hollow base increasing in diameter from the top thereof toward the bottom thereof;
   (b) a generally hemispherical hollow firebox attached to the top of said generally hemispherical base, said generally hemispherical firebox decreasing in diameter from the top thereof toward the bottom thereof; and
   (c) an expandable and contractable fuel element holder disposed in said firebox for regulating the concentration of heat produced by the fuel elements, said holder being formed with apertured panels for combustion air to enter said holder.
3. An outdoor cooking unit comprising:
   (a) a generally hemispherical hollow base increasing in diameter from the top thereof toward the bottom thereof;
   (b) a generally hemispherical hollow firebox attached to the top of said generally hemispherical base, said generally hemispherical firebox decreasing in diameter from the top thereof toward the bottom thereof; and
   (c) an expandable and contractable fuel element holder disposed in said firebox for regulating the concentration of heat produced by the fuel element; and
   (d) means disposed in said holder and responsive to the increase of heat in said firebox for controlling the expansion of said holder.

4. An outdoor cooking unit comprising:
(a) a generally hemispherical hollow base increasing in diameter from the top thereof toward the bottom thereof;
(b) a generally hemispherical hollow firebox attached to the top of said generally hemispherical base, said generally hemispherical firebox decreasing in diameter from the top thereof toward the bottom thereof;
(c) a holder for fuel elements disposed in said firebox, said holder being adjustable in depth and in diametric extent for regulating the concentration of heat produced by fuel elements; and
(d) means disposed in said holder and responsive to the increase of heat in said firebox for adjusting the depth and diametric extent of said holder.

5. An outdoor cooking unit comprising:
(a) a generally hemispherical hollow base increasing in diameter from the top thereof toward the bottom thereof;
(b) a generally hemispherical hollow firebox attached to the top of said generally hemispherical base, said generally hemispherical firebox decreasing in diameter from the top thereof toward the bottom thereof;
(c) a generally hemispherical hollow cover removably supported by said generally hemispherical firebox, said hemispherical cover increasing in diameter from top to bottom; and
(d) a holder for fuel elements, said holder being adjustable in depth and diametric extent for regulating the concentration of heat produced by fuel elements, said holder being formed with apertured panels for combustion air to enter said holder.

6. An outdoor cooking unit comprising:
(a) a generally hemispherical hollow base increasing in diameter from the top thereof toward the bottom thereof;
(b) a generally hemispherical hollow firebox attached to the top of said generally hemispherical base, said generally hemispherical firebox decreasing in diameter from the top thereof toward the bottom thereof;
(c) fastening means detachably securing said generally hemispherical firebox to said generally hemispherical base;
(d) a generally hemispherical hollow cover removably supported by said generally hemispherical firebox, said hemispherical cover increasing in diameter from top to bottom; and
(e) an expandable and contractable fuel element holder for regulating the concentration of heat produced by the fuel elements, said holder being formed with apertured panels for combustion air to enter said holder.

7. An outdoor cooking unit comprising:
(a) a generally hemispherical hollow base increasing in diameter from the top thereof toward the bottom thereof;
(b) a generally hemispherical hollow firebox attached to the top of said generally hemispherical base, said generally hemispherical firebox decreasing in diameter from the top thereof toward the bottom thereof;
(c) a generally hemispherical hollow cover removably supported by said generally hemispherical firebox, said hemispherical cover increasing in diameter from top to bottom;
(d) a holder for fuel elements, said holder being adjustable in depth and diametric extent for regulating the concentration of heat produced by fuel elements; and
(e) means disposed in said holder and responsive to the heat in said firebox for controlling the expansion of said holder.

8. An outdoor cooking unit comprising:
(a) a generally hemispherical hollow base increasing in diameter from the top thereof toward the bottom thereof;
(b) a generally hemispherical hollow firebox attached to the top of said generally hemispherical base, said generally hemispherical firebox decreasing in diameter from the top thereof toward the bottom thereof;
(c) fastening means detachably securing said generally hemispherical firebox to said generally hemispherical base,
(d) a generally hemispherical hollow cover removably supported by said generally hemispherical firebox, said hemispherical cover increasing in diameter from top to bottom;
(e) an expandable and contractable fuel element holder for regulating the concentration of heat produced by the fuel elements; and
(f) means disposed in said holder and responsive to the heat in said firebox for adjusting the depth and diametric extent of said holder.

9. An outdoor cooking unit comprising:
(a) a generally hemispherical hollow base increasing in diameter from the top thereof toward the bottom thereof;
(b) a generally hemispherical hollow firebox attached to the top of said generally hemispherical base, said generally hemispherical firebox decreasing in diameter from the top thereof toward the bottom thereof;
(c) a generally hemispherical hollow cover removably supported by said generally hemispherical firebox, said hemispherical cover increasing in diameter from top to bottom; and
(d) an upright stand disposed below said hemispherical cover for supporting fowl, an upright cylindrical heat reflector disposed below said cover and surrounding said upright stand in spaced relation thereto for directing heat toward the fowl supported by said upright stand, said hemispherical cover being supported by said upright cylindrical heat reflector.

10. An outdoor cooking unit as claimed in claim 9 wherein said reflector comprises upright panels joined to adjacent panels by hinges for forming a foldable cylindrical wall to facilitate the transporting and storage of said reflector.

11. An outdoor cooking unit comprising:
(A) a firebox;
(B) a holder for fuel elements disposed in said firebox, said holder comprising:
(a) a cylindrical base, and
(b) a plurality of panels with openings therein, said panels being hingedly attached to said base in succession along the circumference of said base, each of said panels overlapping and underlying adjacent panels respectively, whereby said holder is adjustable in depth and in diametric extent for regulating the concentration of heat produced by fire elements on said holder; and
(C) a heat sensitive control device disposed in said holder and responsive to the heat in said firebox for adjusting the depth and diametric extent of said holder.

* * * * *